United States Patent
Ahmad et al.

(10) Patent No.: US 8,690,101 B2
(45) Date of Patent: Apr. 8, 2014

(54) TRIPLEX COCKPIT CONTROL DATA ACQUISITION ELECTRONICS

(75) Inventors: Zafar S. Ahmad, Cedar Rapids, IA (US); John W. Roltgen, Cedar Rapids, IA (US); Mark C. Singer, Cedar Rapids, IA (US); Douglas L. Bader, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 34 days.

(21) Appl. No.: 13/475,821

(22) Filed: May 18, 2012

(65) Prior Publication Data

US 2013/0311006 A1    Nov. 21, 2013

(51) Int. Cl.
*B64C 13/00* (2006.01)

(52) U.S. Cl.
USPC .............................. 244/99.4; 701/3; 244/194

(58) Field of Classification Search
USPC ...................................... 701/3; 244/194, 99.4
See application file for complete search history.

(56) References Cited

U.S. PATENT DOCUMENTS

| | | | |
|---|---|---|---|
| 4,965,879 A * | 10/1990 | Fischer, Jr. ........................ 701/3 |
| 5,493,497 A | 2/1996 | Buus | |
| 6,650,973 B2 | 11/2003 | Yamamoto | |
| 7,337,044 B2 * | 2/2008 | Platzer et al. ..................... 701/3 |
| 7,346,793 B2 * | 3/2008 | Sumner ......................... 713/375 |
| 7,878,461 B2 * | 2/2011 | Hirvonen et al. ............. 244/223 |
| 7,984,878 B2 | 7/2011 | Hirvonen | |
| 8,015,390 B1 | 9/2011 | Corcoran et al. | |
| 8,104,720 B2 * | 1/2012 | Hirvonen et al. ............. 244/194 |
| 2011/0190965 A1 * | 8/2011 | Hirvonen et al. ................ 701/3 |
| 2011/0248121 A1 * | 10/2011 | Hirvonen ..................... 244/194 |

OTHER PUBLICATIONS

Gregg F. Bartley, "Boeing B-777: Fly-By-Wire Flight Controls" in The Avionics Handbook, 2001, 14 pages.

* cited by examiner

*Primary Examiner* — Mary Cheung
*Assistant Examiner* — Michael Berns
(74) *Attorney, Agent, or Firm* — Donna P. Suchy; Daniel M. Barbieri

(57) ABSTRACT

A system and method are provided for controlling aircraft flight control surfaces. The system may include at least three pilot sensor channels, each pilot sensor channel including a set of pilot sensor data. The system may also include at least three aircraft sensor channels, each aircraft sensor channel including a set of aircraft sensor data. The system may further include an actuator control component configured to synchronously receive and vote on the pilot sensor data and the aircraft sensor data, such that a voted output of the at least three pilot sensor channels is transmitted to a flight control computer and augmented before being transmitted to remote electronics units. The voted output of the at least three pilot sensor channels providing for the control of the aircraft surfaces coupled to the remote electronics units.

20 Claims, 3 Drawing Sheets

TRIPLEX COCKPIT CONTROL DATA ACQUISITION ELECTRONICS

BACKGROUND

In the past, flight control systems used in many aircraft relied on direct mechanical linkages between the pilot's control devices and the aircraft flight control surfaces. In such systems, pilot-manipulated flight control devices, such as pedals, levers, and the control column, would cause connected mechanical linkages to transmit movement of the pilot control devices to the appropriate aircraft flight control surface, such as the rudders, ailerons, and elevators. Such a rudimentary system of flight control allowed for direct control of the aircraft flight control surfaces and was typically a highly reliable system. However, the mechanical flight control system required frequent, intensive inspection due to the wear and tear on the mechanical linkage, added an undesirable amount of weight to the aircraft, and required a large amount of space to properly operate.

With the advent of analog and digital circuitry, a new flight control system, commonly referred to as "fly-by-wire" or FBW, was developed whereby electronic signals generated in response to the pilot-manipulated control devices could be sent to electronic control devices to process and control movement of the flight control surfaces of the aircraft. The implementation of the fly-by-wire aircraft control system reduced the amount of weight added to the aircraft and provided a smaller footprint in the aircraft as well.

Generally, in conventional fly-by-wire aircraft control systems, electronic signals are generated by the pilot-manipulated control devices, such as the control column, and sent to a flight control computer (FCC), which also receives electronic signals from aircraft sensors providing information related to the aircraft's speed, altitude, angle of attack, and the like. The FCC processes the received electronic signals and generates a correlating instruction signal and sends the instruction signal to one or more actuator control electronics (ACE), where the instruction signal is further processed and transmitted to the appropriate actuator, which may be mechanically coupled to the respective aircraft flight control surface, e.g., the rudder, aileron, or elevator. The instruction signal provided by the FCC causes the actuator to move the aircraft control surface to correspond to the input provided by the pilot, and in some cases, the input provided by the pilot and augmented by the input from the FCC. In such cases in which the FCC augments input provided by the pilot, the fly-by-wire aircraft control system is commonly referred to as operating in "normal mode."

Although the fly-by-wire aircraft control systems are easier to maintain than mechanical systems, the signals generated by modern control fly-by-wire systems can be very complex, and certain failures of electronic subsystems may lead to loss of operational control. In addition, the data buses and/or wires interconnecting the control electronics, actuators, and sensors may become damaged or disconnected, thereby causing interference with, or loss of, the pilot's ability to control the aircraft.

To counter such safety concerns, conventional fly-by-wire aircraft control systems provide for a plurality of microprocessors in each of the FCCs and the ACEs to protect against "random failures." In addition, the conventional fly-by-wire aircraft control systems typically also include a plurality of dissimilar microprocessors in each of the FCCs and the ACEs to protect against "common mode failures" and may also include a plurality of dissimilar FCCs and ACEs to protect against "generic failures." Further yet, to provide for the safe operation of the aircraft, many conventional fly-by-wire aircraft control systems include redundant FCCs and ACEs and/or bypasses to ensure that a failure in part of the fly-by-wire aircraft control system does not cause failure of the entire fly-by-wire aircraft control system. For example, in a conventional fly-by-wire aircraft control system, the failure of one or more FCCs may provide for the bypass of the FCCs, in which the instruction signal corresponding to the input provided by the pilot may be sent directly to the corresponding actuator via one or more ACEs such that the fly-by-wire aircraft control system may be referred to as operating in "direct mode" or stick-to-surface mode.

However, the hardware, e.g., redundant FCCs, ACEs, sensors, and the associated buses created there between, added to provide a high level of fault tolerance in the fly-by-wire aircraft control system, has correspondingly added to the footprint, weight, and maintenance of the fly-by-wire aircraft control system. Such additional weight is highly undesirable in view of the extra fuel required by the aircraft. Further, the larger footprint provides for less room in the aircraft to be utilized for transporting cargo and/or people. Still yet, the additional hardware requires increased maintenance hours and an increased number of replaced components, which adds undesirable cost.

What is needed, then, is a fly-by-wire aircraft control system having a smaller footprint and providing for a reduction in weight and associated maintenance costs over conventional fly-by-wire aircraft control systems currently in use.

SUMMARY

Embodiments of the disclosure may provide a system for controlling aircraft flight control surfaces. The system may include at least three pilot sensor channels including a first channel containing a first set of pilot sensor data, a second channel containing a second set of pilot sensor data, and a third channel containing a third set of pilot sensor data. The system may also include at least three aircraft sensor channels including a primary channel containing a first set of aircraft sensor data, a secondary channel containing a second set of aircraft sensor data, and a tertiary channel containing a third set of aircraft sensor data. The system may further include a first actuator control component operatively connected to the at least three pilot sensor channels and the at least three aircraft sensor channels and configured to synchronously receive and vote on the pilot sensor data from each of the at least three pilot sensor channels and the aircraft sensor data from each of the at least three aircraft sensor channels, such that a voted output of the at least three pilot sensor channels is transmitted to a flight control computer and augmented before being transmitted to remote electronics units. The voted output of the at least three pilot sensor channels may provide for the control of the aircraft surfaces coupled to the remote electronics units.

Embodiments of the disclosure may further provide a method for controlling aircraft flight control surfaces. The method may include generating pilot control signals from each of a first, second, and third set of pilot control sensors, and generating aircraft sensor signals from each of a first, second, and third set of aircraft sensors. The method may also include synchronously transmitting the pilot control signals from the first, second, and third set of pilot control sensors to a first actuator control component via a respective first, second, and third channel operatively connected to the first actuator control component, and synchronously transmitting the aircraft sensor signals from the first, second, and third set of aircraft sensors to the first actuator control component via a respective primary, secondary, and tertiary channel operatively connected to the first actuator control component. The method may further include voting the first, second, and third channels such that a voted output of the pilot control sensors is generated, and voting the primary, secondary, and tertiary channels such that a voted output of the aircraft sensors is generated. The method may also include transmitting the voted output of the pilot control sensors or the voted output of the aircraft sensors to remote electronics units operatively connected to the aircraft flight control surfaces, such that the voted output of the pilot control sensors or the voted output of the aircraft sensors controls the aircraft flight control surfaces.

Embodiments of the disclosure may further provide a system for controlling aircraft flight control surfaces of an aircraft. The system may include a plurality of pilot controlled devices, each operatively connected to at least one of the aircraft control surfaces and configured to be manipulated by an action provided by a pilot of the aircraft. The system may also include a first plurality of pilot control sensors operatively connected to each of the plurality of pilot controlled devices, such that at least one of the first plurality of pilot control sensors is operatively connected to a corresponding one of the plurality of pilot controlled devices, and the at least one of the first plurality of pilot control sensors is configured to generate a first signal containing information related to the respective one of the plurality of pilot controlled devices. The system may further include a second plurality of pilot control sensors operatively connected to each of the plurality of pilot controlled devices, such that at least one of the second plurality of pilot control sensors is operatively connected to the corresponding one of the plurality of pilot controlled devices, and the at least one of the second plurality of pilot control sensors is configured to generate a second signal containing information related to the respective one of the plurality of pilot controlled devices. The system may also include a third plurality of pilot control sensors operatively connected to each of the plurality of pilot controlled devices, such that at least one of the third plurality of pilot control sensors is operatively connected to the corresponding one of the plurality of pilot controlled devices, and the at least one of the third plurality of pilot control sensors is configured to generate a third signal containing information related to the respective one of the plurality of pilot controlled devices. The system may further include a first, second, and third plurality of aircraft sensors, each aircraft sensor configured to detect information related to the aircraft or surrounding environment. The system may also include a first actuator control component. The first actuator control component may include a first, second, and third programmable device, each configured to synchronously receive and vote on the first, second, and third plurality of pilot control sensors to produce a pilot control sensors voted output, and each programmable device further configured to synchronously receive and vote on the first, second, and third plurality of aircraft sensors to produce an aircraft sensors voted output. The first actuator control component may also include a first monitor configured to receive each of the pilot control sensors voted outputs and perform a bit by bit compare to produce a direct mode voted output, and a second monitor configured to receive each of the aircraft sensors voted outputs and perform a bit by bit compare to produce a normal mode voted output. The system may further include a plurality of remote electronics units configured to receive either the direct mode voted output or the normal mode voted output from the first actuator control component, either voted output providing information relative to the control of the aircraft flight control surfaces operatively connected to the plurality of remote electronics units, such that the aircraft flight control surfaces may be controlled by either the direct mode voted output or the normal mode voted output received.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
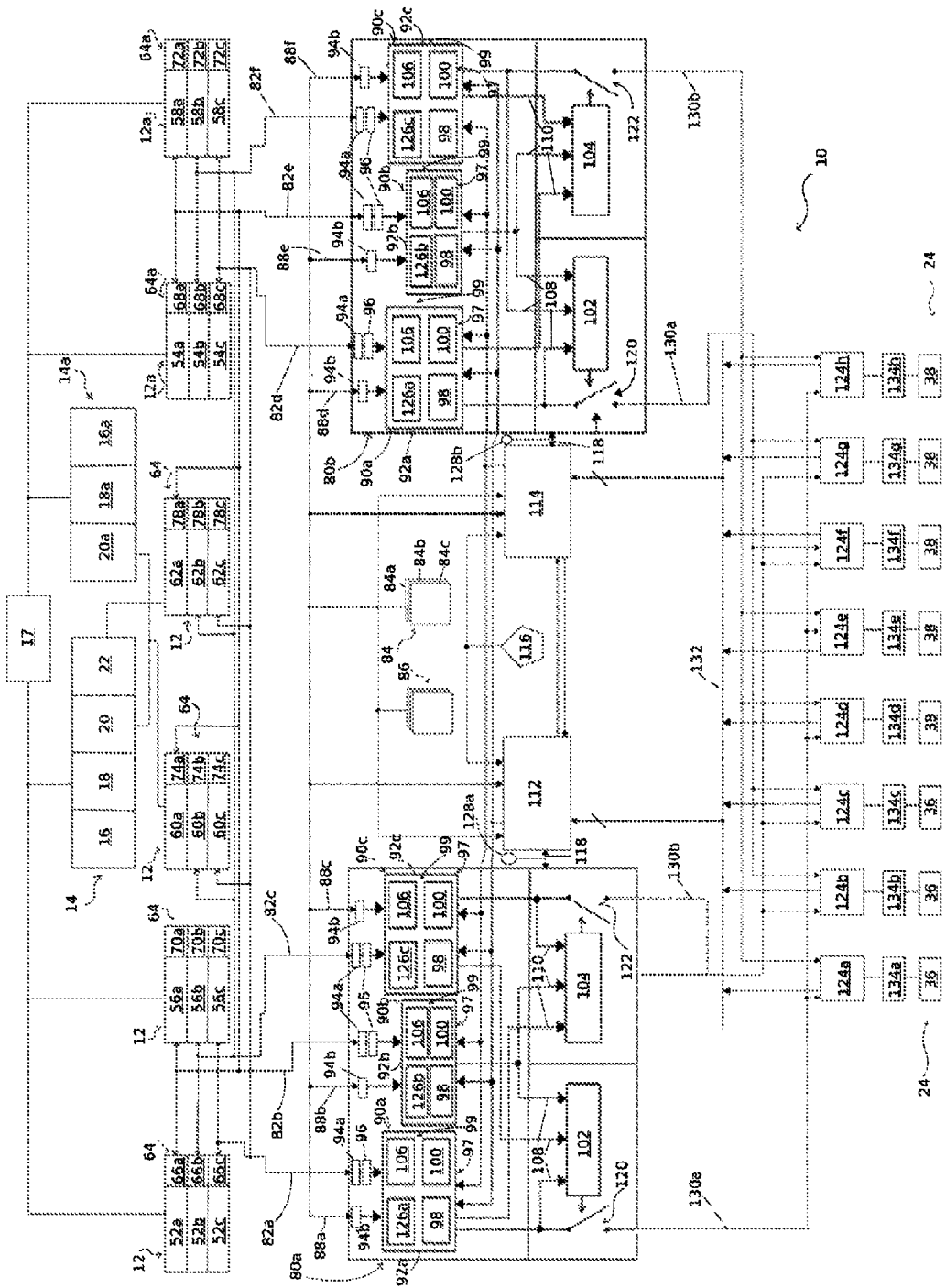
FIG. 1 illustrates a schematic view of an exemplary fly-by-wire aircraft control system, according to an embodiment of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary fly-by-wire aircraft control system 10 according to an embodiment of this disclosure. The fly-by-wire aircraft control system 10 may include a plurality of pilot control sensors 12 operatively connected to corresponding pilot controlled devices 14 and a plurality of copilot control 12a sensors operatively connected to corresponding copilot controlled devices 14a. In an exemplary embodiment, the pilot controlled devices 14 and the copilot controlled devices 14a each include a wheel 16,16a, a control column 18,18a, and a set of pedals 20,20a. The pilot's set of pedals 20 and copilot's set of pedals 20a may be mechanically interconnected such that the pilot and copilot pedals 20,20a operate in unison. In an exemplary embodiment, the pilot's wheel 16 and control column 18 and the copilot's wheel 16a and control column 18a may be connected by an override device 17 and configured such that in normal operation, the pilot and copilot wheels 16,16a and control columns 18,18a also move in unison; however, as needed, the override device 17 may be manipulated such that the pilot wheel 16 and control column 18 and the copilot wheel 16a and control column 18a may move independently of the other. In addition, the pilot controlled devices 14 may include a speed brake lever 22 and a set of elevator feel actuators (not shown). It will be understood by one of ordinary skill in the art that the speed break lever 22 and the set of elevator feel actuators may be disposed between the pilot (not shown) and copilot (not shown) and further operated by the copilot as needed.

Figure 2:
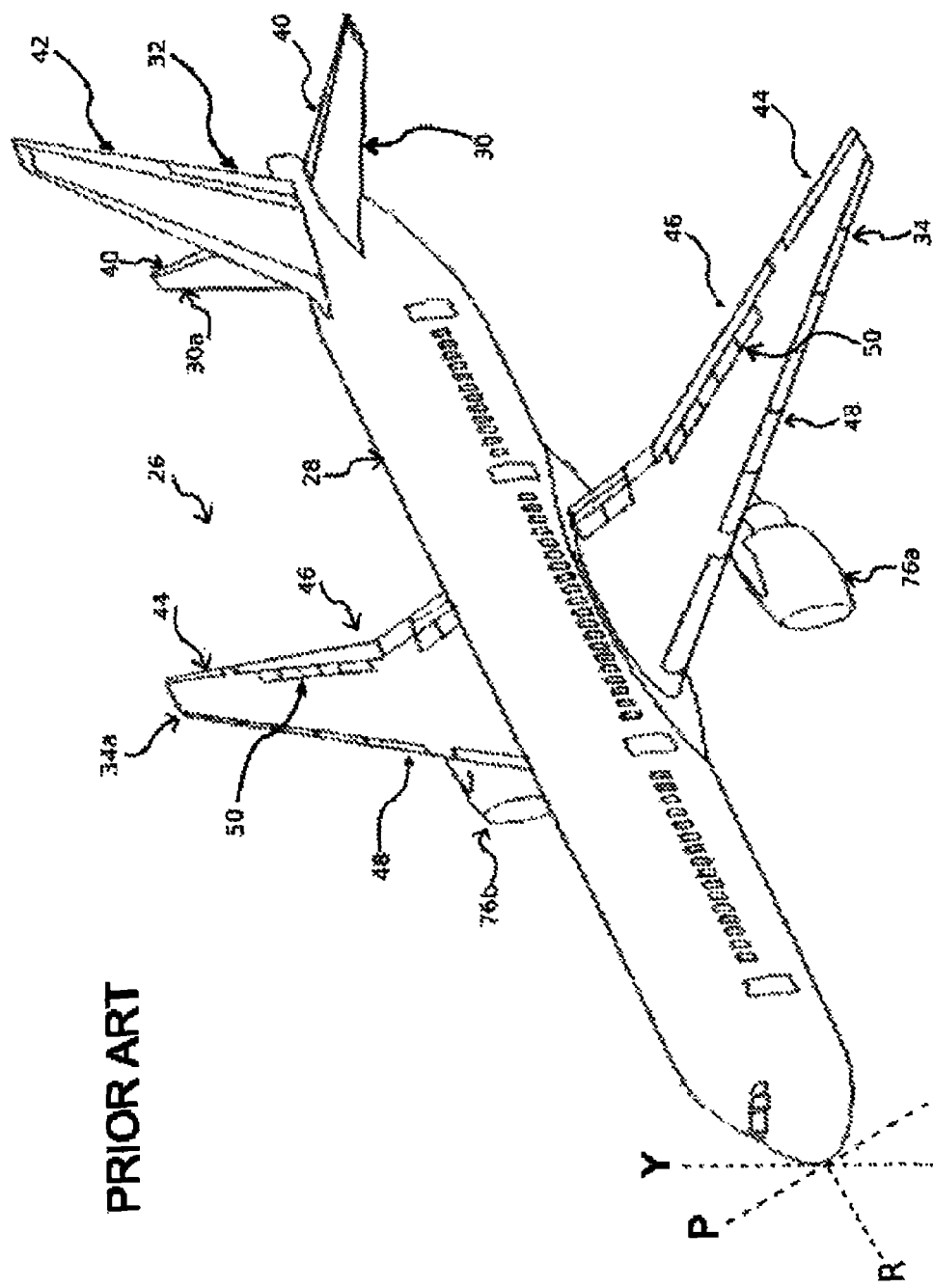
FIG. 2 illustrates a perspective view of an exemplary aircraft configured to utilize the exemplary fly-by wire aircraft control system of FIG. 1.

As will be further explained in the detailed description, in an exemplary embodiment, each of the pilot controlled devices 14 and copilot controlled devices 14a may be operatively connected to one or more aircraft flight control surfaces 24 coupled to an aircraft 26 having a fuselage 28, a first and second horizontal stabilizer 30,30a, a vertical stabilizer 32, and first and second wings 34,34a as shown in FIG. 2. It will be appreciated by one of ordinary skill in the art that the configuration of the aircraft may vary, and may include, for example, a plurality of vertical stabilizers or a lack of vertical stabilizers. The aircraft flight control surfaces 24 may include primary aircraft flight control surfaces 36 and secondary aircraft flight control surfaces 38. The primary aircraft flight control surfaces 36 may include an elevator 40 disposed on each horizontal stabilizer 30,30a, a rudder 42 disposed on the vertical stabilizer 32, and an aileron 44 disposed on each wing 34,34a. The primary aircraft flight control surfaces 36 may control movement of the aircraft 26 in one or more of the three directional aircraft axes (roll axis R, pitch axis P, and yaw axis Y). For example, manipulation of the pilot's set of pedals 20 may cause the rudder 42 to move, which may be used to control movement of the aircraft 26 about the yaw axis Y, whereas movement of the pilot's and/or copilot's control column 18,18a may control movement of the aircraft 26 about the roll axis R or pitch axis P depending on the movement of the control column 18,18a, i.e., port/starboard or forward/aft, respectively. Specifically, movement of the control column 18,18a in the forward/aft direction may cause the movement of the elevators 40, thereby affecting movement about the pitch axis P of the aircraft 26, while movement of the control column 18,18a in the port/starboard direction may cause the movement of the ailerons 44, thereby affecting movement of the aircraft 26 about the roll axis R. It will be appreciated by one of ordinary skill in the art that the control column 18,18a may be moved in a combined forward-starboard direction, in a combined forward-port direction, in a combined aft-starboard direction, and in a combined aft-port direction.

The secondary aircraft flight control surfaces 38 may include a plurality of flaps 46, slats 48, and spoilers 50 disposed on each wing 34,34a. The secondary aircraft flight control surfaces 38 may influence the lift and drag of the aircraft 26. For example, manipulation of the pilot's speed brake lever 22 may cause one or more spoilers 50 to extend from the aircraft 26, such that drag is increased and the speed of the aircraft 26 is decreased.

As shown in FIG. 1, the plurality of pilot and copilot control sensors 12,12a may include three pilot control pitch sensors 52a,b,c and three copilot control pitch sensors 54a,b,c, each configured to detect the position of the aircraft 26 about the pitch axis P as controlled by manipulation of the respective pilot and copilot control columns 18,18a in the forward/aft direction. The plurality of pilot and copilot sensors 12,12a may also include three pilot control roll sensors 56a,b,c and three copilot control roll sensors 58a,b,c, each configured to detect the position of the aircraft 26 about the roll axis R as controlled by manipulation of the respective pilot and copilot control columns 18,18a in the port/starboard direction.

The plurality of pilot sensors 12 may also include three pilot control yaw sensors 60a,b,c, each configured to detect the position of the aircraft 26 about the yaw axis Y as controlled by manipulation of the pilot's pedals 20. As noted above, in an embodiment, the pilot and copilot pedals 20,20a are mechanically interconnected such that the pedals 20,20a move in unison. Thus, movement of the pedals 20,20a by either the pilot or copilot results in the same positioning of the aircraft 26. It will be appreciated by one of ordinary skill in the art that additional yaw sensors may be employed in an embodiment including independent pilot and copilot pedals 20,20a.

Further, the plurality of pilot sensors may include three pilot control speed brake sensors 62a,b,c, each configured to detect the lift and/or drag of the aircraft 26 as controlled by the manipulation of the pilot's speed brake lever 22. Although FIG. 1 illustrates the foregoing pilot and/or copilot control sensors 12,12a, embodiments including other pilot and/or copilot control sensors known in the art are contemplated herein.

In an exemplary embodiment, the plurality of pilot and copilot sensors 12,12a may include at least three sensors utilized to detect a certain aircraft information, characteristic, parameter, or status identifier, such as the aircraft's movement about the yaw axis Y, roll axis R, or pitch axis P. Utilizing at least three sensors to detect the aircraft characteristic, parameter, or status identifier allows for the data provided by the sensors to be included in a voting procedure, discussed in further detail below. The use of three pilot and/or copilot sensors 12,12a for a particular aircraft characteristic allows for a high integrity command to be determined; however, embodiments in which two, or four or more pilot and copilot sensors 12,12a are utilized to detect a particular aircraft characteristic or status component are contemplated herein, such that the data from the pilot and copilot sensors 12,12a may be used to compare, average, vote, or select a mid-value to derive a high integrity output.

One or more of the plurality of pilot control sensors 12 may include pilot control transducers 64. In an exemplary embodiment, each of the pilot control sensors 12 includes a corresponding pilot control transducer 64. Correspondingly, one or more of the copilot controlled sensors 12a may include copilot control transducers 64a. In an exemplary embodiment, each of the copilot control sensors 12a includes a corresponding copilot control transducer 64a. At least one of the pilot control transducers 64 and the copilot control transducers 64a may be configured to generate one or more signals that are proportional to the movement and/or position of the respective pilot controlled device 14 and/or copilot controlled device 14a. In at least one embodiment, the signals generated by the respective pilot and copilot control transducers 64,64a may be analog signals. In an exemplary embodiment, the pilot control transducer 64 and/or the copilot control transducer 64a may include a linear variable differential transformer (LVDT), a rotary variable differential transformer (RVDT), or a resolver; however, other electrical components capable of generating an electrical signal correlating to the change in position of the pilot controlled device and/or copilot controlled device are also contemplated herein. Further, in another embodiment, one or more of the pilot and copilot sensors 12a,12a may be a respective pilot and copilot transducer 64,64a.

In an exemplary embodiment, each of the three pilot control pitch sensors 52a,b,c may include a pilot control pitch transducer 66a,b,c such that the fly-by-wire aircraft control system may include a first pilot control pitch transducer 66a, a second pilot control pitch transducer 66b, and a third pilot control pitch transducer 66c, each operatively connected to the pilot control column 18 and configured to generate a corresponding transducer signal related to the pitch axis P of the aircraft 26 depending on the movement of the pilot control column 18 in the forward/aft direction. Correspondingly, each of the three copilot control pitch sensors 54a,b,c may include a copilot control pitch transducer 68a,b,c such that the fly-by-wire aircraft control system 10 may include a first copilot control pitch transducer 68a, a second copilot control pitch transducer 68b, and a third copilot control pitch transducer 68c, each operatively connected to the copilot control column 18a and configured to generate a corresponding transducer signal related to the pitch axis P of the aircraft 26 depending on the movement of the copilot control column 18a in the forward/aft direction.

In an exemplary embodiment, each of the three pilot control roll sensors 56a,b,c may include a pilot control roll transducer 70a,b,c such that the fly-by-wire aircraft control system 10 may include a first pilot control roll transducer 70a, a second pilot control roll transducer 70b, and a third pilot control roll transducer 70c, each operatively connected to the pilot control column 18 and configured to generate a corresponding transducer signal related to the roll axis R of the aircraft 26 depending on the movement of the pilot control column 18 in the port/starboard direction. Correspondingly, each of the three copilot control roll sensors 58a,b,c may include a copilot control roll transducer 72a,b,c such that the fly-by-wire aircraft control system 10 may include a first copilot control roll transducer 72a, a second copilot control roll transducer 72b, and a third copilot control roll transducer 72c, each operatively connected to the copilot control column 18a and configured to generate a corresponding transducer signal related to the roll axis R of the aircraft 26 depending on the movement of the copilot control column 18a in the port/starboard direction.

In an exemplary embodiment, each of the three pilot control yaw sensors 60a,b,c may include a pilot control yaw transducer 74a,b,c such that the fly-by-wire aircraft control system 10 may include a first pilot control yaw transducer 74a, a second pilot control yaw transducer 74b, and a third pilot control yaw transducer 74c, each operatively connected to the pilot pedals 20 and configured to generate a corresponding transducer signal related to the yaw axis Y of the aircraft 26 depending on the movement of the pilot pedal 20 manipulated. It will be appreciated by one of ordinary skill in the art that the aircraft movement about the yaw axis Y may also be achieved by varying the thrust levels from the engines 76a, 76b on opposing sides of the aircraft 26. Embodiments in which the yaw sensors 60a,b,c and corresponding yaw transducers 74a,b,c are operatively connected to the throttle (not shown) are contemplated herein.

In an exemplary embodiment, each of the three pilot control speed brake sensors 62a,b,c may include a pilot control speed brake transducer 78a,b,c such that the fly-by-wire aircraft control system may include a first pilot control speed brake transducer 78a, a second pilot control speed brake transducer 78b, and a third pilot control speed brake transducer 78c, each operatively connected to the pilot's speed brake lever 22 and configured to generate a corresponding transducer signal related to the lift and/or drag of the aircraft 26 depending on the amount of manipulation of the pilot's speed brake lever 22. As noted above, embodiments in which the copilot controls the speed brake lever 22 and pedals 20a, thereby affecting the lift and/or drag of the aircraft 26 and the yaw axis Y of the aircraft 26, respectively, are contemplated herein.

The fly-by-wire aircraft control system 10 may include a plurality of actuator control components, referred to as actuator control electronics (ACEs) 80a,80b. In an exemplary embodiment, the plurality of ACEs includes a first ACE 80a, referred to as a first cockpit control data acquisition electronics component (CCDAE), and a second ACE 80b, referred to as a second CCDAE. The first and second CCDAE 80a,80b may each be operatively coupled to the plurality of pilot and copilot control sensors 12,12a via a plurality of lines or channels 82a-f. Each channel may be configured to transmit the one or more transducer signals generated by the respective pilot and/or copilot transducer 64,64a.

In an exemplary embodiment, each CCDAE 80a,80b may be operatively connected to the plurality of pilot and copilot sensors 12,12a via three channels 82a-f. The first CCDAE 80a may be operatively connected to the plurality of pilot and copilot sensors 12,12a via a first CCDAE first channel 82a, a first CCDAE second channel 82b, and a first CCDAE third channel 82c. The first CCDAE first channel 82a may be configured such that the one or more transducer signals generated by one or more of the first pilot and copilot control pitch transducers 66a,68a, the first pilot and copilot control roll transducers 70a,72a, the first pilot control yaw transducer 74a, and the first pilot control speed brake transducer 78a may be transmitted to the first CCDAE 80a. The first CCDAE second channel 82b may be configured such that the one or more transducer signals generated by one or more of the second pilot and copilot control pitch transducers 66b,68b, the second pilot and copilot control roll transducers 70b,72b, the second pilot control yaw transducer 74b, and the second pilot control speed brake transducer 78b may be transmitted to the first CCDAE 80a. The first CCDAE third channel 82c may be configured such that the one or more transducer signals generated by one or more of the third pilot and copilot control pitch transducers 66c,68c, the third pilot and copilot control roll transducers 70c,72c, the third pilot control yaw transducer 74c, and the third pilot control speed brake transducer 78c may be transmitted to the first CCDAE 80a.

Correspondingly, the second CCDAE 80b may be operatively connected to the plurality of pilot and copilot sensors 12,12a via a second CCDAE first channel 82d, a second CCDAE second channel 82e, and a second CCDAE third channel 82f. The second CCDAE first channel 82d may be configured such that the one or more transducer signals generated by one or more of the first pilot and copilot control pitch transducers 66a,68a, the first pilot and copilot control roll transducers 70a,72a, the first pilot control yaw transducer 74a, and the first pilot control speed brake transducer 78a may be transmitted to the second CCDAE 80b. The second CCDAE second channel 82e may be configured such that the one or more transducer signals generated by one or more of the second pilot and copilot control pitch transducers 66b, 68b, the second pilot and copilot control roll transducers 70b,72b, the second pilot control yaw transducer 74b, and the second pilot control speed brake transducer 78b may be transmitted to the second CCDAE 80b. The second CCDAE third channel 82f may be configured such that the one or more transducer signals generated by one or more of the third pilot and copilot control pitch transducers 66c,68c, the third pilot and copilot control roll transducers 70c,72c, the third pilot control yaw transducer 74c, and the third pilot control speed brake transducer 78c may be transmitted to the second CCDAE 80b.

In addition to receiving the transducer signals generated and transmitted by the pilot and copilot transducers 64,64a, the first and second CCDAE 80a,80b each receive transducer signals generated by a plurality of aircraft sensors 84 operatively connected to each CCDAE 80a,80b. In an exemplary embodiment, the plurality of aircraft sensors 84,86 of the fly-by-wire aircraft control system 10 includes direct mode aircraft sensors 84 and normal mode aircraft sensors 86. As illustrated in FIG. 1, each CCDAE 80a,80b may be operatively coupled to the direct mode aircraft sensors 84 via lines or channels 88a-f. In an exemplary embodiment, channels 88a-f may form a digital communication link.

The direct mode aircraft sensors 84 may include roll rate, yaw rate, pitch rate sensors and the like. In an exemplary embodiment, the direct mode aircraft sensors 84 may be configured to supply discrete or digital inputs to each CCDAE 80a,80b. Each CCDAE 80a,80b may include one or more circuits (not shown) configured to acquire the plurality of discrete inputs. In an exemplary embodiment, the discrete inputs may be acquired from trim switches, command switches, and the like. Further, one or more of the discrete inputs may be latched via a latch (not shown) upon initially supplying power to the CCDAEs 80a,80b. In an embodiment in which the discrete input may be utilized for a dynamic response, a filtering component (not shown) may be applied to the discrete input. The time constant of the circuits configured to acquire the plurality of discrete inputs may be configured to have a time constant of five to ten milliseconds.

In an exemplary embodiment, the fly-by-wire aircraft control system 10 includes a plurality of direct mode aircraft sensors 84 including a first set of three direct mode aircraft sensors 84a, a second set of three direct mode aircraft sensors 84b, and a third set of three direct mode aircraft sensors 84c. In an exemplary embodiment, the three direct mode aircraft sensors in each set 84a,b,c detect an identical property or characteristic of the aircraft 26. For example, the three sensors of the first set 84a may detect the roll rate, yaw rate, and pitch rate, respectively. Accordingly, the second and third set 84b,84c of sensors may also detect the roll rate, yaw rate, and pitch rate, respectively. By doing so, the direct mode aircraft sensors 84 may undergo a voting process in each CCDAE 80a,80b to determine a direct mode command, as will be discussed below in greater detail. Each set 84a,b,c of direct mode aircraft sensors 84 may be operatively connected to each CCDAE 80a,80b via the respective three respective channels 88a-c,88d-f, such that the first CCDAE 80a may be configured to receive the signals generated by the first set 84a of direct mode aircraft sensor via a first CCDAE direct mode aircraft sensor first channel 88a, the signals generated by the second set 84b of direct mode aircraft sensors via a first CCDAE direct mode aircraft sensor second channel 88b, and the signals generated by the third set 84c of direct mode aircraft sensors via a first CCDAE direct mode aircraft sensor third channel 88c. Correspondingly, the second CCDAE 80b may be configured to receive the signals generated by the first set 84a of direct mode aircraft sensor via a second CCDAE direct mode aircraft sensor first channel 88d, the signals generated by the second set 84b of direct mode aircraft sensors via a second CCDAE direct mode aircraft sensor second channel 88e, and the signals generated by the third set 84c of direct mode aircraft sensors via a second CCDAE direct mode aircraft sensor third channel 88f.

Each CCDAE 80a,80b may be configured to be a line replaceable unit including at least one printed circuit board (PCB) 90a,b,c. Each PCB 90a,b,c may include a plurality of programmable devices 92a,b,c. In an exemplary embodiment, the programmable devices may be field programmable gate arrays (FPGAs) 92a,b,c operatively connected to and disposed on each of the PCBs 90a,b,c. In another embodiment, the programmable devices may be, for example, programmable logic devices (PLDs), application-specific integrated circuits (ASICs), or central processing units (CPUs). In an exemplary embodiment, each CCDAE 80a,80b includes three PCBs 90a,b,c, each having a first FPGA 92a, a second FPGA 92b, and a third FPGA 92c. The first, second, and third FPGA 92a,b,c of the first CCDAE 80a may be configured to be operatively connected to a respective one of the first, second, and third, first CCDAE channels 82a,b,c and a respective one of the first, second, and third first CCDAE direct mode aircraft sensor channels 88a,b,c.

In an exemplary embodiment, each CCDAE 80a,80b may include a plurality of demodulators (not shown) configured to recover the information content from each transducer signal generated by the pilot and copilot transducers 64,64a and transmitted to the respective CCDAE 80a,80b via the respective CCDAE channel 82a-f. Each CCDAE 80a,80b may also include a plurality of anti-alias filters (not shown), such that the demodulator outputs in each channel 82a-f may be fed through an anti-alias filter to reduce noise susceptibility and alias effects of sampling. In an exemplary embodiment, each demodulator output may have rigging electronic capability; however, the authority of rigging may be limited to a percentage of full scale based on the aircraft requirements.

Each FPGA 92a,b,c in the respective CCDAE 80a,80b is operatively coupled to one or more multiplexers 94a,94b. In an exemplary embodiment, each transducer signal, e.g., pilot transducer signal or copilot transducer signal, having passed through the demodulator and anti-alias filter is fed into a first multiplexer 94a, such that the transducer signals form a single line input. The digital or discrete inputs provided from the signals transmitted in the respective direct mode aircraft sensor channels 88a-f may be fed into a respective second multiplexer 94b such that the discrete inputs form a separate single line input from the first multiplexer 94a. The single line input formed from the transducer signals are fed into an analog to digital (A/D) converter 96 controlled by the respective FPGA 92a,b,c. The resulting data output from the A/D converter 96 may be fed to the FPGA 92a,b,c in addition to the single line input generated from the second multiplexer 94b and the discrete inputs.

In an exemplary embodiment, each FPGA 92a,b,c of the first CCDAE 80a may be configured to receive both the single line input generated from the transducer signals and the single line input generated from the discrete inputs for each of the other FPGAs 92a,b,c. For example, the first FPGA 92a of the first CCDAE 80a receives the single line input generated from the transducer signals of the first CCDAE first channel 82a and the single line input generated from the discrete inputs of the first CCDAE direct mode aircraft sensor first channel 88a. In addition, the first FPGA 92a of the first CCDAE 80a receives the single line input generated from the transducer signals of the first CCDAE second channel 82b and the single line input generated from the discrete inputs of the first CCDAE direct mode aircraft sensor second channel 88b. Further, the first FPGA 92a of the first CCDAE 80a receives the single line input generated from the transducer signals of the first CCDAE third channel 82c and the single line input generated from the discrete inputs of the first CCADE direct mode aircraft sensor third channel 88c. By providing each FPGA 92a,b,c of the first CCDAE 80a with the information from each channel 82a-c, 88a-c, a voting procedure may be implemented in each FPGA 92a,b,c, which will be discussed in more detail below.

In an exemplary embodiment, each FPGA 92a,b,c operatively connected to the respective channels 82a-f provides for the voting of the transducer sensors input into the CCDAE 80a,80b. Each channel output is voted against the other channel outputs. Thus, in the three channel configuration of each CCDAE 80a,80b, the loss of a channel does not cause the fly-by-wire aircraft control system 10 to enter direct mode control. The CCDAE 80a,80b remains fail-operative. Such a voting procedure allows for a high integrity command, i.e., $10^{-9}$ or greater, to be output. In an exemplary embodiment, the voting of the pilot and copilot sensors 12,12a and the digital or discrete inputs is carried out synchronously. The ability to provide a voting procedure with synchronized inputs provides for the CCDAE output to be fail-operative, and also provides for the elimination of Byzantine failures. In order for the inputs of the respective FPGAs 92a,b,c of each CCDAE 80a,80b to be synchronized, the fly-by-wire aircraft control system may include a plurality of control systems or loops configured to synchronize the clock 98 of each FPGA 92a,b,c and the inputs received via the respective channels 82a-f,88a-f.

In an exemplary embodiment, the plurality of control system or loops includes a first, or inner, control system 97 or loop and a second, or outer, control system 99 or loop. The inner control loop 97 may be provided by a minor count generator 100 provided in each of the FPGAs 92a,b,c. The minor count generator 100 of each FPGA 92a,b,c may receive minor counts generated for example at 20 MHz by each of the other FPGAs 92a,b,c, and a first and second monitor 102,104 further discussed below. Each minor count generator 100 processes the minor counts received and generates a selected frequency, e.g. 1 MHz, pulse substantially synchronized, i.e. within ten or fewer nanoseconds, with the clocks 98 of the other FPGAs 92a,b,c.

The outer control loop 99 may be provided by a task generator 106 provided in each of the FPGAs 92a,b,c. The task generator 106 of each FPGA 92a,b,c may be configured to operate as an incremental counter according to a programmed logic. In an exemplary embodiment, the programmed logic may include the instructions such that if the counts of each channel are equal to the counts of one other channel, the counter is incremented. For example, if the first CCDAE first channel 88a is equal to the count provide by first CCDAE second channel 88b, the counter is incremented. Otherwise, the counter returns to zero. By doing so, the counts of each FPGA 92a,b,c provide for the synchronization of the three FPGAs 92a,b,c. The counter in each task generator 106 may count up to 32 before recycling back to 1. Accordingly, each FPGA 92a,b,c may provide for a 32 bit cyclic redundancy check in an exemplary embodiment.

Each PCB 90a,b,c may include the first monitor 102 and the second monitor 104 introduced above. In an exemplary embodiment, each monitor 102,104 may be a logic device providing a bit by bit compare. Each monitor 102,104 may be configured to receive the voted output of each FPGA 92a,b,c. The voted output of the each FPGA 92a,b,c includes the voted direct mode command and the voted normal mode command. The voted direct mode command may be sent to the first monitor via line 108 and the voted output of the normal mode command may be sent to the second monitor via line 110.

In an exemplary embodiment, the voted output of the normal mode command may be sent to the FCCs 112,114. An augmented normal mode command may be provide by the each FCC's flight control computer control system (not shown) based on the data received from the normal mode aircraft sensors 86 and flap/slat controller data provided by the flap/slat controller 116. The augmented normal mode command may be passed back to the respective CCDAE 80a,80b via a bidirectional digital communication link 118 and sent to the second monitor 104. The voted normal mode command or augmented normal mode command is monitored in the second monitor 104 to determine if the command is valid or corrupted. This output is a high integrity output with a bit by bit compare. In an exemplary embodiment, a switch 120,122 may be manipulated in the respective monitor 102, 104 corresponding to the validity of the normal mode command. For example, the switch 122 may be oriented in the second monitor 104 in such a manner as to allow the normal mode command to be outputted to one or more remote electronics units (REUs) 124a-h when the normal mode command is valid, and the corresponding switch 120 in the first monitor 102 may be oriented to prohibit the direct mode command from being outputted to the respective REUs 124a-h. Correspondingly, if the normal mode command is determined to be corrupt or invalid, the orientation of the switches 120,122 of the respective monitors 102,104 may be reversed such that the normal mode command is prohibited from being outputted, and the direct mode command is allowed to be outputted to the respective REUs 124a-h.

Each CCDAE 80a,80b may include a plurality of excitation components 126a,b,c, each configured to provide excitation via an electrical current to one or more pilot and/or copilot transducers 64,64a such that data provided by the respective transducer 64,64a may be transmitted to each CCDAE 80a,80b. In an embodiment, the excitation component 126a,b,c may include a current generator. The excitation component 126a,b,c may include an independent buffer (not shown) and may be operatively connected to the transducers 64,64a such that a single fault does not affect the performance of the other transducers 64,64a. The excitation component 126a,b,c may generate an electrical current having a frequency of about 1800 Hz to 2400 Hz; however, higher or lower frequencies are contemplated herein. In an exemplary embodiment, each CCDAE 80a,80b may include three excitation components 126a,b,c, each excitation component operatively connected to the respective CCDAE first, second, and third channels 82a,b,c. Each excitation component 126a, b,c in the respective channel 82a,b,c may produce two synchronous electrical currents being 180 degrees out of phase with each other. In an embodiment, the amplitude of each electrical current may be controlled by a closed loop circuit as will be appreciated by one of ordinary skill in the art.

Conventionally, a fly-by-wire aircraft control system may require up to six ACEs to provide the appropriate availability as required by certain government regulations; however, in an aspect of the present disclosure, the fly-by-wire aircraft control system 10 may only employ two ACEs 80a,80b to achieve the desired availability required. Further, the failure of a single ACE, or a single channel of the ACE, of the present disclosure does not prohibit the fly-by-wire aircraft control system 10 from operating in normal mode.

The first and second CCDAEs 80a,80b may each be supplied by a respective primary power supply 128a,128b. In an exemplary embodiment, the primary power supply 128a, 128b may have a voltage of 28 $V_{DC}$ and may be rated for approximately 7.5 Watts per channel; however, embodiments in which the voltage and power rating may be higher or lower are contemplated herein. The primary power supply 128a, 128b may include a single filter (not shown) and inrush limiter (not shown). The primary power supply source 128a, 128b may be permanent magnet generators coupled to the respective aircraft engine 76a,76b configured to generate AC power. The AC may be converted into the 28 $V_{DC}$. Secondary power supply sources (not shown) may include the aircraft's ram air turbine, the 28 $V_{DC}$ main aircraft buses, and the aircraft hot battery bus. In an exemplary embodiment, transistor-transistor logic (TTL) may be added to select between the primary power source 128a,128b and the secondary power source. In such an embodiment, the current limited primary power source 128a,128b may be distributed to generate power. Each of the three channels 82a-f in the first and second CCDAE 80a,80b may include switching regulators (not shown) to generate the voltages used by the components, i.e., digital and analog, in each of the CCDAEs 80a,80b. In an exemplary embodiment, a secondary voltage may be generated off of the filtered and current limited primary power supply 128a,128b. The secondary voltage may be utilized to monitor the power supply generated voltages.

As indicated above, the fly-by-wire aircraft control system may include a plurality of flight control computers (FCCs) 112,114, each operatively coupled to the first CCDAE 80a and the second CCDAE 80b via a digital data bus. In an exemplary embodiment, the digital data bus may be a bidirectional digital communication link 118. Multiple FCCs 112,114 may be utilized in a redundant manner to increase the availability of the fly-by-wire aircraft control system 10 and to ensure safe operation of the aircraft 26 in case of failure of a single FCC 112,114. In an exemplary embodiment, the fly-by-wire aircraft control system 10 may include a first FCC 112 and a second FCC 114. As noted above, failure of one or more FCCs 112,114 may cause the aircraft 26 to switch from a normal mode operation to a direct mode operation in which the normal mode operation is bypassed. In an exemplary embodiment, each FCC 112,114 may include a plurality of processors (not shown), including a plurality of dissimilar processors to substantially reduce the occurrence of common mode and random failures.

In a conventional FCC, the FCC is operative to receive an operational instruction via a plurality of channels from the pilot via the pilot control sensors or an operation instruction from the copilot via the copilot control sensors. The FCC, in the known art, is configured to undertake a voting process to determine the validity of the signals received, wherein a label or word is scanned and monitored from the signals received from each channel or lane. Conventionally, a single computing lane may be declared the "master" lane, and that lane is responsible for transmitting all data onto the data buses for use by the ACEs and other airplane systems; however, each of the channels are simultaneously computing the same control law. The outputs of the channels are compared against each other. Correspondingly, each FCC output may be compared against the outputs of the other FCCs to determine the value output to the ACE and the related actuator. As disclosed above, in an exemplary embodiment of this disclosure, the monitoring and voting of the pilot and/or copilot control sensors 12,12a may be carried out in each CCDAE 80a,80b upstream of the plurality of FCCs 112,114. Such architecture of an exemplary embodiment of the present disclosure provides for the reduction in the amount of data that must be transmitted on the associated data buses, which reduces the amount of wire required for data buses and provides for a reduction in weight of the fly-by-wire aircraft control system 10.

As noted above, the fly-by-wire aircraft control system 10 may include a plurality of aircraft sensors 84,86 including direct mode aircraft sensors 84 and normal mode aircraft sensors 86. The normal mode aircraft sensors 86 may form at least a portion of the inertial reference system (IRS) and may include accelerometers, compasses, magnetometers, clinometers, and the like. In an exemplary embodiment, the normal mode aircrafts sensors 86 may be operatively coupled to each FCC 112,114. The normal mode aircraft sensors 86 may include pressure sensors, such as pitot tubes, positioning sensors, strain gauges, and heat gauges and sensors, such as total air temperature (TAT) probes. The normal mode aircraft sensors 86 may be configured to provide information related to the performance and/or status of the aircraft 26 and the surrounding environment to each FCC 112,114. For example, the normal mode aircraft sensors 86 may include information related to the pressure, altitude, speed, heading, temperature, G-forces, and the like of the aircraft. In an exemplary embodiment, multiple normal mode aircraft sensors 86 may be employed to detect a defined performance or status characteristic of the aircraft 26 in a redundant manner to ensure safe operation of the aircraft 26 in case of failure of one or more of the normal mode aircraft sensors 86.

Each FCC 112,114 may be operatively connected to the flap/slat controller 116. Conventionally, the flap/slat controller may have a direct interface with a flat/slat lever at the pilot controls and excitation of additional sensors may be required to receive the signals carrying data regarding the flap/slat controller. In an exemplary embodiment, the flap/slat controller 116 may receive the required data from each of the CCDAEs 80a,80b due to the high availability, i.e., $10^{-9}$ or greater, provided by each CCDAE 80a,80b. Thus, additional excitation components may be reduced by providing the required data from each CCDAE 80,80b to the flap/slat controller 116 via each FCC 112,114 as illustrated in FIG. 1.

In an exemplary embodiment, each FCC 112,114 may be configured to receive the output from each CCDAE 80a,80b and one or more information signals generated by and transmitted from each of the normal mode aircraft sensors 86 operatively coupled to each FCC 112,114. Each FCC 112,114 may be further configured to compare the output received from each CCDAE 80a,80b with the information signals received from the normal mode aircraft sensors 86 to determine the appropriate output to return to each CCDAE 80a, 80b.

The fly-by-wire aircraft control system 10 may include a plurality of remote electronics units (REUs) 124a-h. Each REU 124a-h may be operatively coupled to each of the CCDAEs 80a,80b via a plurality of digital buses 130a,130b. In an exemplary embodiment, each REU 124a-h is operatively coupled to each of the CCDAEs 80a,80b via a first digital bus 130a and a second digital bus 130b. Each REU 124a-h may be operatively connected to the each of the FCCs 112,114 via a digital bus 132 and configured to allow a signal to be output to each FCC 112,114 via the digital bus 132. The output signal provided by one or more REUs 124a-h to the FCCs 112,114 may provide status information regarding the one or more REUs 124a-h. In an exemplary embodiment, each CCDAE 80a,80b sends each REU 124a-h the voted normal mode command if no corruption is found in the voted normal command. In an embodiment in which the voted normal mode command is found to be deficient, the direct mode command is transmitted to each REU 124a-h from the respective CCDAE 80a,80b. In an embodiment in which the direct mode command may be sent to each REU 124a-h, one or more REUs 124a-h may output a signal to each CCDAE 80a,80b in relation to the direct mode command. The outputted signal may include data corresponding to an acknowledgement of receipt of the direct mode command. In another embodiment, one or more REUs 124a-h may output one or more signals produced by the corresponding operatively coupled actuator(s) 134a-h to the first and second monitors 102,104 of each CCDAE 80a,80b. Such outputted signal(s) may be routed to each CCDAE 80a,80b via the digital bus 132 and the corresponding FCCs 112,114.

Each REU 124a-h may include a digital to analog converter (D/A) (not shown) configured to receive the digital signal transmitted from the respective CCDAE 80a,80b and convert the digital signal to an analog signal. The converted analog signal may be transmitted via one or more relays (not shown) and amplified via one or more amplifiers (not shown) before being transmitted to a corresponding actuator 134a-h. In an exemplary embodiment, each REU 124a-h is installed integrally with the corresponding actuator 134a-h; however, embodiments in which the REU 124a-h is installed proximal to the corresponding actuator 134a-h are contemplated herein as well.

As introduced above, the fly-by-wire aircraft control system 10 may include a plurality of actuators 134a-h, each operatively coupled to the corresponding remote electronics unit 124a-h. Each actuator 134a-h may be a hydraulic actuator controlled by an electric signal. In an exemplary embodiment, the electrical signal may be the analog signal received from the corresponding REU 124a-h. The actuator 134a-h may transform the analog signal received from the REU 124a-h into motion, which may be used to manipulate a corresponding aircraft flight control surface 24, which will be discussed further below. The actuator 134a-h may be a servo valve-controlled linear cylinder, a high speed rotary motor driving a reduction gear, or the like. In another embodiment, the actuator 134a-h may be an electromechanical actuator. The actuator 134a-h may further include a sensor, such as a potentiometer, configured to transmit a signal to the REU 124a-h reporting the position of the actuator 134a-h. The transmitted signal provides the REU 124a-h with a reference to determine when the actuator 134a-h has reached the desired position.

As stated above, one or more actuators 134a-h may be operatively coupled to the corresponding aircraft flight control surface 24 of the aircraft 26. In an exemplary embodiment, one or more of the aircraft flight control surfaces 24 may be driven by two or three actuators 134a-h, each powered by a separate REU 124a-h. In an exemplary embodiment, the actuator 134a-h may be a servo valve-controlled linear cylinder configured to manipulate a piston, or ram, to move forward or aft to move a hinge arm connected to the aircraft flight control surface 24.

Turning to the operation of the fly-by-wire aircraft control system 10, exemplary operation of the fly-by-wire aircraft control system 10 embodied in FIGS. 1 and 2 is presented now. In such an exemplary operation, an excitation is provided by the respective excitation components 126a,b,c in the first CCDAE 80a and the second CCDAE 80b to the plurality of pilot and copilot sensors 12,12a. Each CCDAE 80a,80b may be substantially similar in function to the other CCDAE; thus, like numerals correspond to like elements and the operation of only one CCDAE 80a will be detailed for the sake of brevity. It will be appreciated by one of ordinary skill in the art that the following description of the operation of the first CCDAE 80a is applicable to the second CCDAE 80b. Such excitation may be provided to the pilot and copilot control sensors 12,12a including pilot and copilot control transducers 64,64a via an electrical current. The pilot and copilot control transducers 64,64a may be transformers such that the electrical current provides excitation and the generation of a transducer signal from each of the plurality of pilot and copilot control transducers 64,64a.

As shown in FIG. 1, the first CCDAE 80a may receive, via the first CCDAE first channel 82a, the transducer signals generated by the first pilot and copilot control roll transducers 70a,72a, the transducer signals generated by the first pilot and copilot control pitch transducers 66a,68a, the transducer signal generated by the first pilot control yaw transducer 74a, and the transducer signal generated by the first pilot control speed brake transducer 78a. Correspondingly, the first CCDAE 80a may receive, via the first CCDAE second channel 82b, the transducer signals generated by the second pilot and copilot control roll transducers 70b,72b, the transducer signals generated by the second pilot and copilot control pitch transducers 66b,68b, the transducer signal generated by the second pilot control yaw transducer 74b, and the transducer signal generated by the second pilot control speed brake transducer 78b. Further, the first CCDAE 80a may receive, via the first CCDAE third channel 82c, the transducer signals generated by the third pilot and copilot control roll transducers 70c,72c, the transducer signals generated by the third pilot and copilot control pitch transducers 66c,68c, the transducer signal generated by the third pilot control yaw transducer signal 74c, and the transducer signal generated by the third pilot control speed brake transducer 78c.

The first CCDAE 80a may further receive, via the direct mode aircraft sensor first channel 88a, the respective signals generated from each direct mode aircraft sensor 84 of the first set 84a of three direct mode aircraft sensors. Correspondingly, the first CCDAE 80a may receive, via the direct mode aircraft sensor second channel 88b, the respective signals generated from each direct mode aircraft sensor 84 of the second set 84b of three direct mode aircraft sensors. Further, the first CCDAE 80a may receive, via the direct mode aircraft sensor third channel 88c, the respective signals generated from each direct mode aircraft sensor 84 of the third set 84c of three direct mode aircraft sensors. As noted above, each direct mode aircraft sensor 84 may be a digital signal or may form a discrete input after being fed through circuitry provided by the first CCDAE 80a.

In an exemplary embodiment, the first CCDAE 80a includes a first FPGA 92a, a second FPGA 92b, and a third FPGA 92c, and each of the three FPGAs 92a,b,c may be coupled to a first and second multiplexer 94a,94b. The transducer signals transmitted via the first CCDAE first channel 82a may be demodulated and filtered before being fed into the first multiplexer 94a coupled to the first FPGA 92a to form a primary first channel single line input. The primary first channel single line input may be fed into the A/D converter 96 coupled to the first multiplexer 94a. The digital or discrete inputs transmitted via the direct mode aircraft sensor first channel 88a may be fed into the second multiplexer 94b coupled to the first FPGA 92a to form a secondary first channel single line input. The primary first channel single line input and the secondary first channel single line input may be fed into the first FPGA 92*a*. The primary first channel single line input and the secondary first channel single line input may then be split such that a portion of the primary first channel single line input and the secondary first channel single line input may be fed to the second FPGA 92*b* and a portion of the primary first channel single line input and the secondary first channel single line input may be fed to the third FPGA 92*c*.

The transducer signals transmitted via the first CCDAE second channel 82*b* may be demodulated and filtered before being fed into the first multiplexer 94*a* coupled to the second FPGA 92*b* to form a primary second channel single line input. The primary second channel single line input may be fed into the A/D converter 96 coupled to the first multiplexer 94*a*. The digital or discrete inputs transmitted via the direct mode aircraft sensor second channel 88*b* may be fed into the second multiplexer 94*b* coupled to the second FPGA 92*b* to form a secondary second channel single line input. The primary second channel single line input and the secondary second channel single line input may be fed into the second FPGA 92*b*. The primary second channel single line input and the secondary second channel single line input may then be split such that a portion of the primary second channel single line input and the secondary second channel single line input may be fed to the first FPGA 92*a* and a portion of the primary second channel single line input and the secondary second channel single line input may be fed to the third FPGA 92*c*.

The transducer signals transmitted via the first CCDAE third channel 82*c* may be demodulated and filtered before being fed into the first multiplexer 94*a* coupled to the third FPGA 92*c* to form a primary third channel single line input. The primary third channel single line input may be fed into the A/D converter 96 coupled to the first multiplexer 94*a*. The digital or discrete inputs transmitted via the direct mode aircraft sensor third channel 88*c* may be fed into the second multiplexer coupled to the third FPGA 92*c* to form a secondary third channel single line input. The primary third channel single line input and the secondary third channel single line input may be fed into the third FPGA 92*c*. The primary third channel single line input and the secondary third channel single line input may then be split such that a portion of the primary third channel single line input and the secondary third channel single line input may be fed to the first FPGA 92*a* and a portion of the primary third channel single line input and the secondary third channel single line input may be fed to the second FPGA 92*b*.

The three CCDAE channels 82*a-c* and the three direct mode aircraft sensor channels 88*a-c* may be fed to the respective first, second, and third FPGAs 92*a,b,c* in a synchronized fashion as a result of the inner and outer control loops 97,99 provided. The inner clock loop 97 may be provided by a minor count generator 100 provided in each of the FPGAs 92*a,b,c*. The minor count generator 100 of each FPGA 92*a,b,c* may receive minor counts generated for example at 20 MHz by the other FPGAs 92*a,b,c*, and the first and second monitors 102,104. Each minor count generator 100 processes the minor counts received and generates a selected frequency pulse, e.g. 1 MHz, substantially synchronized, i.e. within ten or fewer nanoseconds, with the clocks 98 of the other FPGAs 92*a,b,c*.

The outer control loop 99 may be provided by a task generator 106 provided in each of the FPGAs 92*a,b,c*. The task generator 106 of each FPGA 92*a,b,c* may be configured to operate as an incremental counter according to a programmed logic. In an exemplary embodiment, the programmed logic may include the instructions such that if the counts of each channel are equal to the counts of one other channel, the counter is incremented. For example, if the first CCDAE first channel 88*a* is equal to the count provide by first CCDAE second channel 88*b*, the counter is incremented. Otherwise, the counter returns to zero. The counter in each task generator may count up to 32 before recycling back to 1. Accordingly, the FPGA 92*a,b,c* may provide for a 32 bit cyclic redundancy check in an exemplary embodiment.

The synchronized three CCDAE channels 82*a-c* fed into each FPGA 92*a,b,c* may undergo a voting procedure in the corresponding FPGA 92*a,b,c* to determine a high integrity direct mode command output. The synchronized three direct mode aircraft sensor channels 88*a-c* fed into each FPGA 92*a,b,c* may also undergo a voting procedure in the corresponding FPGA 92*a,b,c* to determine a high integrity normal mode command output. Each direct mode command output of the respective FPGA 92*a,b,c* may be fed to the first monitor via line 108, wherein a bit by bit compare is performed on the three direct mode outputs to determine a high integrity direct mode command output.

The high integrity normal mode command of each FPGA 92*a,b,c* may be sent to each FCC 112,114, wherein the normal mode sensor data and the flap/slat controller data provided by the normal mode aircraft sensors 86 and flap/slat controller 116 operatively connected to each FCC 112,114 may provide the FCC control system with data correlating to the production of an augmented normal mode command from the normal mode command initially received from the first CCDAE 80*a*. The augmented normal mode command may be sent back to the first CCDAE 80*a* via the bidirectional data bus 118 where the augmented normal mode command may undergo a bit by bit compare in the second monitor 104.

In an exemplary embodiment, a switch 120,122 may be manipulated in the respective monitor 102,104 corresponding to the validity of the normal mode command or augmented normal mode command. For example, a switch 122 may be oriented in the second monitor 104 in such a manner as to allow the normal mode command or augmented normal mode command to be outputted to the respective REUs 124*a-h* when the normal mode command or augmented normal mode command is valid, and a corresponding switch 120 in the first monitor 102 may be oriented to prohibit the direct mode command from being outputted to the respective REUs 124*a-h*. Correspondingly, if the normal mode command or augmented normal mode command is determined to be corrupt or invalid, the orientation of the switches 120,122 of the respective monitors 102,104 may be reversed such that the normal mode command or augmented normal mode command is prohibited from being outputted, and the direct mode command is allowed to be outputted to the respective REUs 124*a-h*.

As stated above, if determined to be valid by the first CCDAE 80*a*, the normal mode command or augmented normal mode command may be transmitted to the respective REUs 124*a-h*; otherwise, the direct mode command may be transmitted to the corresponding REUs 124*a-h*. The direct or normal mode command provided instructs the REUs 124*a-h* on the positioning of the appropriate aircraft flight control surfaces 24. Each REU 124*a-h* may include a digital to analog converter (D/A) configured to receive the digital signal transmitted from the first CCDAE 80*a* and convert the digital signal to an analog signal. The converted analog signal may be transmitted via one or more relays and amplified via one or more amplifiers before being transmitted to the corresponding actuator 134*a-h*.

Each actuator 134*a-h* may be a hydraulic actuator controlled by an electric signal. In an exemplary embodiment, the electrical signal may be the analog signal received from the corresponding REU 124a-h. The actuator 134a-h may transform the analog signal received from the REU 124a-h into motion, which may be used to manipulate a corresponding aircraft flight control surface 24. The actuator 134a-h may further include a sensor, such as a potentiometer, configured to transmit a signal to the REU 124a-h reporting the position of the actuator 134a-h. The transmitted signal provides the REU 124a-h with a reference to determine when the actuator 134a-h has reached the desired position. In an exemplary embodiment, the actuator 134a-h may be a servo valve-controlled linear cylinder configured to manipulate a piston, or ram, to move forward or aft to move a hinge arm connected to the aircraft flight control surface 24.

Figure 3:
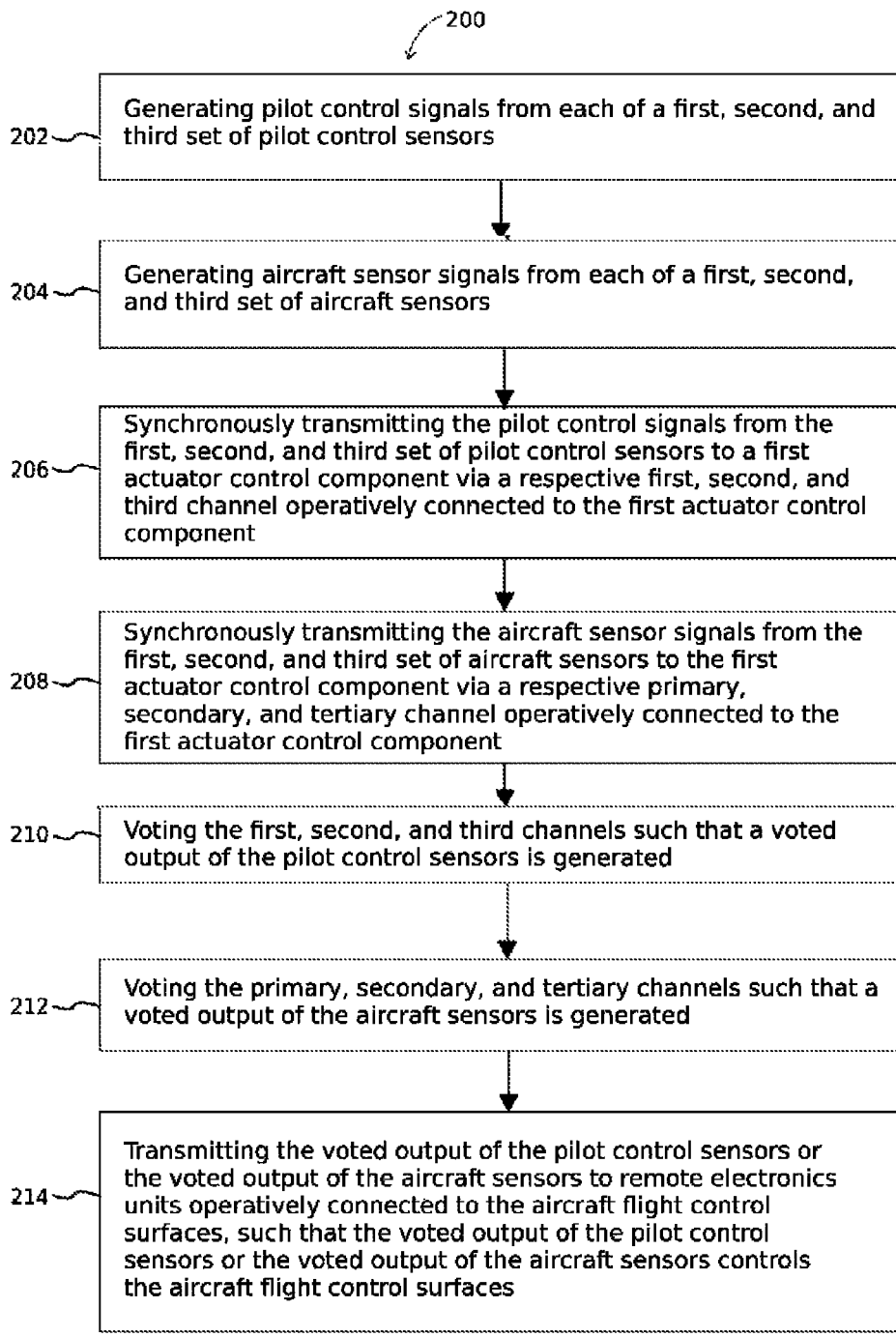
FIG. 3 illustrates a flowchart of a method for controlling aircraft flight control surfaces of an aircraft, according to an embodiment of the disclosure.

In another embodiment illustrated in FIG. 3, an exemplary method 200 for controlling one or more aircraft flight control surfaces of an aircraft is provided. The method 200 may include generating pilot control signals from each of a first, second, and third set of pilot control sensors, as at 202. The method may also include generating aircraft sensor signals from each of a first, second, and third set of aircraft sensors, as at 204.

The method may further include synchronously transmitting the pilot control signals from the first, second, and third set of pilot control sensors to a first actuator control component via a respective first, second, and third channel operatively connected to the first actuator control component, as at 206, and synchronously transmitting the aircraft sensor signals from the first, second, and third set of aircraft sensors to the first actuator control component via a respective primary, secondary, and tertiary channel operatively connected to the first actuator control component, as at 208.

The first actuator control component may include a first programmable device, a second programmable device, and a third programmable device, each of the first, second, and third programmable devices being operatively connected to the first, second, and third channels and the primary, secondary, and tertiary channels, and each of the first, second, and third programmable devices being configured to vote on the first, second, and third channels and the primary, secondary, and tertiary channels, such that the first, second, and third programmable devices produce a respective first, second, and third pilot control sensor voted output and a respective first, second, and third aircraft sensor voted output. A clock of each programmable device may be synchronized with a respective clock of the other programmable devices.

The method may also include voting the first, second, and third channels such that a voted output of the pilot control sensors is generated, as at 210, and voting the primary, secondary, and tertiary channels such that a voted output of the aircraft sensors is generated, as at 212. The method may further include transmitting the voted output of the pilot control sensors or the voted output of the aircraft sensors to remote electronics units operatively connected to the aircraft flight control surfaces, such that the voted output of the pilot control sensors or the voted output of the aircraft sensors controls the aircraft flight control surfaces, as at 214.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A system for controlling aircraft flight control surfaces, comprising:
   at least three pilot sensor channels including a first channel containing a first set of pilot sensor data, a second channel containing a second set of pilot sensor data, and a third channel containing a third set of pilot sensor data;
   at least three aircraft sensor channels including a primary channel containing a first set of aircraft sensor data, a secondary channel containing a second set of aircraft sensor data, and a tertiary channel containing a third set of aircraft sensor data; and
   a first actuator control component operatively connected to the at least three pilot sensor channels and the at least three aircraft sensor channels and configured to synchronously receive and vote on the pilot sensor data from each of the at least three pilot sensor channels and the aircraft sensor data from each of the at least three aircraft sensor channels, such that a voted output of the at least three pilot sensor channels is transmitted to a flight control computer and augmented before being transmitted to remote electronics units, the voted output of the at least three pilot sensor channels providing for the control of the aircraft surfaces coupled to the remote electronics units.

2. The system of claim 1, wherein a voted output of the at least three aircraft sensors is alternatively transmitted to the remote electronics units.

3. The system of claim 1, wherein the first actuator control component includes first, second, and third programmable devices, each of the devices being operatively connected to the at least three pilot sensor channels and the at least three aircraft sensor channels, and each of the devices being configured to vote on the at least three pilot sensor channels and the at least three aircraft sensor channels, such that the first, second, and third programmable devices produce a respective first, second, and third pilot sensor voted output and a respective first, second, and third aircraft sensor voted output.

4. The system of claim 3, wherein the first actuator control component includes a first monitor and a second monitor, the first monitor being configured to receive the first, second, and third aircraft sensor voted output and provide a bit by bit compare of the first, second, and third aircraft sensor voted output to produce a voted output of the at least three aircraft sensor channels, and the second monitor being configured to receive the first, second, and third pilot sensor voted output and provide a bit by bit compare of the first, second, and third pilot sensor voted output to produce the voted output of the at least three pilot sensor channels.

5. The system of claim 3, wherein the first actuator control component includes a first control system configured to synchronize a clock of each programmable device with a respective clock of each of the other programmable devices.

6. The system of claim 5, wherein the first actuator control component includes a second control system comprising a counter and configured to synchronize the first, second, and third set of pilot sensor data received in each programmable device via the respective first, second, and third channels and to synchronize the first, second, and third set of aircraft sensor data received in each programmable device via the respective primary, secondary, and tertiary channels.

7. The system of claim 1, wherein each set of pilot sensor data is provided by a signal generated by a plurality of pilot control sensors operatively connected to one or more pilot controlled devices.

8. The system of claim 1, wherein each set of aircraft sensor data is provided by a signal generated by a plurality of aircraft sensors configured to provide information related to the aircraft or surrounding environment.

9. The system of claim 1, further comprising a plurality of direct mode aircraft sensors and a plurality of normal mode aircraft sensors, each normal mode aircraft sensor being configured to provide normal mode sensor data to the flight control computer, such that the voted output of the at least three pilot sensor channels is augmented according to the normal mode sensor data, and each set of aircraft sensor data being provided by a signal generated by the plurality of direct mode aircraft sensors.

10. The system of claim 9, wherein the signal generated by the plurality of direct mode aircraft sensors is a digital or discrete input.

11. A method for controlling aircraft flight control surfaces, comprising:
generating pilot control signals from each of a first, second, and third set of pilot control sensors;
generating aircraft sensor signals from each of a first, second, and third set of aircraft sensors;
synchronously transmitting the pilot control signals from the first, second, and third set of pilot control sensors to a first actuator control component via a respective first, second, and third channel operatively connected to the first actuator control component;
synchronously transmitting the aircraft sensor signals from the first, second, and third set of aircraft sensors to the first actuator control component via a respective primary, secondary, and tertiary channel operatively connected to the first actuator control component;
voting the first, second, and third channels such that a voted output of the pilot control sensors is generated;
voting the primary, secondary, and tertiary channels such that a voted output of the aircraft sensors is generated; and
transmitting the voted output of the pilot control sensors or the voted output of the aircraft sensors to remote electronics units operatively connected to the aircraft flight control surfaces, such that the voted output of the pilot control sensors or the voted output of the aircraft sensors controls the aircraft flight control surfaces.

12. The method of claim 11, further comprising:
augmenting the voted output of the pilot control sensors in a flight control computer; and
transmitting an augmented voted output of the pilot controlled sensors to the remote electronics units.

13. The method of claim 11, wherein the first actuator control component includes first, second, and third programmable devices, each of the devices being operatively connected to the first, second, and third channels and the primary, secondary, and tertiary channels, and each of the devices being configured to vote on the first, second, and third channels and the primary, secondary, and tertiary channels, such that the first, second, and third programmable devices produce a respective first, second, and third pilot control sensor voted output and a respective first, second, and third aircraft sensor voted output.

14. The method of claim 13, further comprising:
receiving in a first monitor of the first actuator control component the first, second, and third aircraft sensor voted output;
receiving in a second monitor of the first actuator control component the first, second, and third pilot sensor voted output;
providing a bit by bit compare of the first, second, and third aircraft sensor voted output to produce the voted output of the aircraft sensors; and
providing a bit by bit compare of the first, second, and third aircraft sensor voted output to produce the voted output of the pilot control sensors.

15. The method of claim 13, further comprising synchronizing a clock of each programmable device with a respective clock of each of the other programmable devices.

16. The method of claim 15, further comprising:
synchronizing the first, second, and third set of pilot sensor data received in each programmable device via the respective first, second, and third channels; and
synchronizing the first, second, and third set of aircraft sensor data received in each programmable device via the respective primary, secondary, and tertiary channels.

17. A system for controlling aircraft flight control surfaces of an aircraft, comprising:
a plurality of pilot controlled devices, each operatively connected to at least one of the aircraft control surfaces and configured to be manipulated by an action provided by a pilot of the aircraft;
a first plurality of pilot control sensors operatively connected to each of the plurality of pilot controlled devices, such that at least one of the first plurality of pilot control sensors is operatively connected to a corresponding one of the plurality of pilot controlled devices, and the at least one of the first plurality of pilot control sensors is configured to generate a first signal containing information related to the respective one of the plurality of pilot controlled devices;
a second plurality of pilot control sensors operatively connected to each of the plurality of pilot controlled devices, such that at least one of the second plurality of pilot control sensors is operatively connected to the corresponding one of the plurality of pilot controlled devices, and the at least one of the second plurality of pilot control sensors is configured to generate a second signal containing information related to the respective one of the plurality of pilot controlled devices;
a third plurality of pilot control sensors operatively connected to each of the plurality of pilot controlled devices, such that at least one of the third plurality of pilot control sensors is operatively connected to the corresponding one of the plurality of pilot controlled devices, and the at least one of the third plurality of pilot control sensors is configured to generate a third signal containing information related to the respective one of the plurality of pilot controlled devices;
a first, second, and third plurality of aircraft sensors, each aircraft sensor configured to detect information related to the aircraft or surrounding environment;
a first actuator control component comprising
a first, second, and third programmable device, each configured to synchronously receive and vote on the first, second, and third plurality of pilot control sensors to produce a pilot control sensors voted output, and each programmable device further configured to synchronously receive and vote on the first, second, and third plurality of aircraft sensors to produce an aircraft sensors voted output;
a first monitor configured to receive each of the pilot control sensors voted outputs and perform a bit by bit compare to produce a direct mode voted output; and
a second monitor configured to receive each of the aircraft sensors voted outputs and perform a bit by bit compare to produce a normal mode voted output; and a plurality of remote electronics units configured to receive either the direct mode voted output or the normal mode voted output from the first actuator control component, either voted output providing information relative to the control of the aircraft flight control surfaces operatively connected to the plurality of remote electronics units, such that the aircraft flight control surfaces may be controlled by either the direct mode voted output or the normal mode voted output received.

18. The system of claim 17, further comprising a flight control computer operatively connected to the first actuator control component, the flight control computer configured to augment the aircraft sensors voted outputs according to information provided by a plurality of normal mode aircraft sensors operatively connected to the flight control computer.

19. The system of claim 17, further comprising a plurality of actuators, at least one of the plurality of actuators integral with a respective remote electronics unit.

20. The system of claim 17, further comprising a first control system configured to synchronize a clock of each programmable device with a respective clock of each of the other programmable devices.

\* \* \* \* \*